April 8, 1952     H. C. HEIER     2,592,279
VARIABLE-STRENGTH BEVERAGE DISPENSER
Filed Jan. 16, 1950     2 SHEETS—SHEET 1

INVENTOR,
HENRY C. HEIER,
BY Terry Cohn
ATTORNEYS.

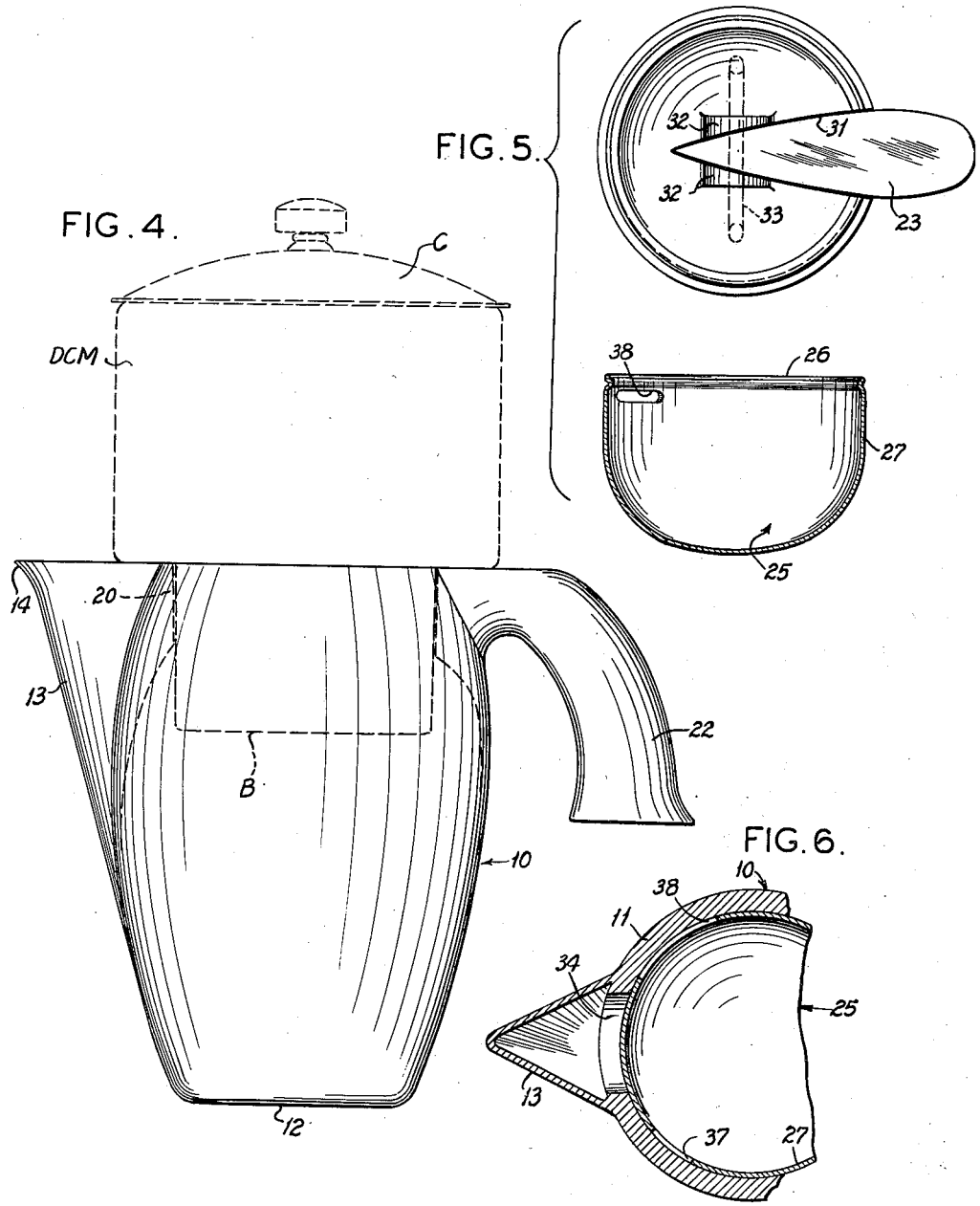

UNITED STATES PATENT OFFICE 2,592,279

VARIABLE-STRENGTH BEVERAGE DISPENSER

Henry C. Heier, Kimmswick, Mo.

Application January 16, 1950, Serial No. 138,914

11 Claims. (Cl. 222—145)

This invention relates to improvements in variable-strength beverage dispensers, and more particularly to a self-contained, multiple-compartment serving pot for beverages of water-extract type, such as tea and coffee. For brevity, but without limitation, the embodiment of the disclosure will be referred to as it is employed in serving coffee.

Certain attempts have heretofore been made toward the design of coffee dispensers or the like, of such nature that, from a given brew or batch, coffee or a like beverage can be poured in a strength or concentration to meet the individual desire of the user. Such devices have, however, thus far exhibited the shortcomings of undue complication and an excessive number of parts; a difficulty in cleaning between periods of usage, an excessive cost of manufacture, and numerous others. It is accordingly a principal objective of the present invention to overcome each and all of the several inadequacies above enumerated in respect to that class of dispensers intended to deliver at will and from a given brew, a beverage of varying proportions or strength.

The invention may be summarized by reference to the embodiment currently disclosed, as consisting of an outer pouring container or pot, as for coffee, and provided with a pouring spout. Set into the upper portion of the pot is a multiple purpose structure in the form of a cup-like water-reservoir, a cover element of which also serves with the reservoir, as a closure for the pot. Such reservoir and cover unit will serve as the rotor element of a rotary valve, the upper wall of the reservoir being provided with one or more water delivery ports, and if a plurality thereof, such ports being of graduated area. A valve seat formation is formed on or carried by the walls of the pot just below its upper margin. Such seat formation is arcuate and preferably annular, and conforms to the ported wall region of the water reservoir so as to coact therewith as a water valve. A passage through the arcuate valve seat is directed into the spout of the pot, slightly spaced from the coffee pouring opening, so that a relatively smaller stream of water may be fed into the outflowing coffee stream, thus providing a controlled dilution of an initially full strength brew. The water reservoir and cover constitute not only a valve barrel, but the rotor of a top dial bears indicia significant of strength of coffee to be poured from the pot. Indexing indicia are provided on the pot to coact with the markings or graduations on the dial rotor.

A prime structural object of the present improvements is realized in an assembly for the purpose noted which, for controlling strength of poured beverage need consist of only one movable element of such nature as to require no service attention, and to present a minimum likelihood of damage due to impacts in the course of cleaning the parts of the dispenser.

A further general object of the current improvements is realized in a dispenser for coffee or like beverage, which need involve no more separable parts or elements than the coffee pot proper, and a closure therefor.

Yet another object of importance realized in the present improvements, is an absence of any external rods, triggers, buttons, or other objectionable protuberances, thus providing an entirely smooth exterior of the device, resulting from the use of a simple water-throttling means and a control member therefor which may be actuated by a finger or thumb of the user, while gripping the pot handle.

A further general objective of the improvements is realized in a combined water-flow control and valve unit, together with the water reservoir all easily removed, as for cleaning and incident to making the coffee or other beverage, merely by lifting such unit from the top of the pot.

The foregoing and numerous other objects will more clearly appear from the following detailed description of a presently preferred embodiment, particularly when considered in connection with the accompanying drawing, in which:

Fig. 4 is a side elevational view of the dispenser showing certain elements of a drip type coffee maker in dotted lines;

Fig. 5 is an exploded view showing the water reservoir in vertical section, together with a bottom plan view of the cover or lid element of the water reservoir, prior to their assembly, and Fig. 6 is a fragmentary sectional view taken in a horizontal plane through the upper portion of the water reservoir and an upper portion of the pot, Fig. 6 being particularly located by line 6—6 of Fig. 3.

Figure 1:
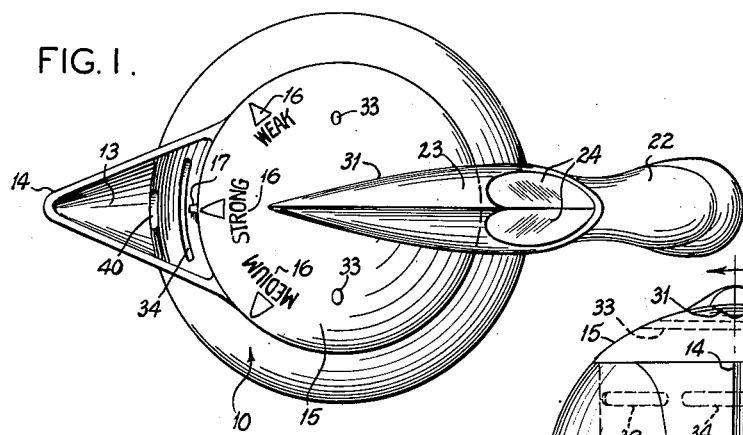
Fig. 1 is a top plan view of a coffee dispenser embodying present improvements.

Referring now by characters of reference to the drawing, and first to Fig. 1, the dispenser is shown as including an outer container or coffee pot proper, generally indicated at 10, and comprising an upwardly divergent then convergent side wall 11, preferably circular in transverse section, the side wall structure merging into and preferably integrally formed with a bottom 12. Faired into the frontal portion of the side wall, is an elongate, tapered, pouring spout 13 provided with a pouring lip 14 at its upper terminus.

The pot is provided with a cover or lid generally designated at 15, which is of a domed contour, and which is provided with indicia 16 including pointers significant of strength of the coffee or like beverage to be poured from the pot, as will later herein be more fully discussed, such indicia coacting with a lug 17 as a reference mark coacting with the several pointers, it being noted that the cover together with the element 17 thus constitutes a control dial, visible and movable from the top of the pot for the purpose noted.

The pot 10 is provided in the upper region of its wall or walls 11, with an arcuate, preferably annular, inwardly projecting thickened wall portion 20, the portion 20 being provided with transverse openings for the reception of attachment screws 21 directed into a pot handle 22 of pistol-grip type, which may be formed of a suitable plastic resin composition. The pot proper may be formed for example, of cast aluminum or a suitable alloy thereof. Overlying the cover 15 is a cover handle 23 which is in the form of an attenuated pointer member of such length and proportions as itself to provide a general indication of angular position of the cover and appurtenances, as will later appear. The cover handle 23 is provided in its heel region with a symmetrical arrangement of paired thumb recesses 24 which, as will appear, will be usually located more or less directly in line with the outer curved portion of the grip 22, so as to enable an angular shift of the cover about its axis in either direction, as by engagement of the thumb or other digit while the hand engages the grip 22.

An important feature of the present structure consists of a simple yet positive form of valve for controlling the extent of dilution, and with which is combined in the present disclosure, a water reservoir. Secured to the cover 15 and depending therefrom into the chamber of the pot 10, is a cup-shape water reservoir 25 preferably permanently attached as a unit to the cover 15 as by a crimped connection, or by threading the parts as exemplified by the threads 26 on the upper margin of the water reservoir 25, preferably but not necessarily, deforming a portion of such threads so that the two elements 15 and 25 normally remain attached. It is pointed out that the cup reservoir 25 in the example shown is used for hot water only, hence there is rarely any need for extensive cleansing of its interior, such as in the pot proper 10.

A word is in order as to general proportions between the cup 25 and the pot proper. The cup may be, as shown, of considerable less capacity than the pot proper, inasmuch as a water dilution of the order of 10%–20% by volume will, even with the contents of pot 10 brewed to strength, usually suffice to yield a poured coffee of weakest acceptable strength.

The cover 15 is of slightly larger diameter than the adjacent substantially cylindrical wall portion 27 of cup 25, so as to result in an overhanging margin of the cover which is slidably rotatable (or at least partly rotatable) over an undercut shoulder 30, the overhanging of the cover being thus accurately centered in place by the shoulder.

Access for filling the cup 25 is had through an opening just beneath and conforming to the cover handle 23, such opening being indicated at 31. It will now appear that the cover handle 23 serves as a closure for the opening 31 and for such purpose may be lifted to clear the opening, as shown in dotted lines by Fig. 3. Provision enabling this member to be lifted, includes a pair of dependent ears or lugs 32 transversely apertured and bridged by a pivot pin 33 traversing such apertures and adjacent end of the handle 23.

Figure 2:
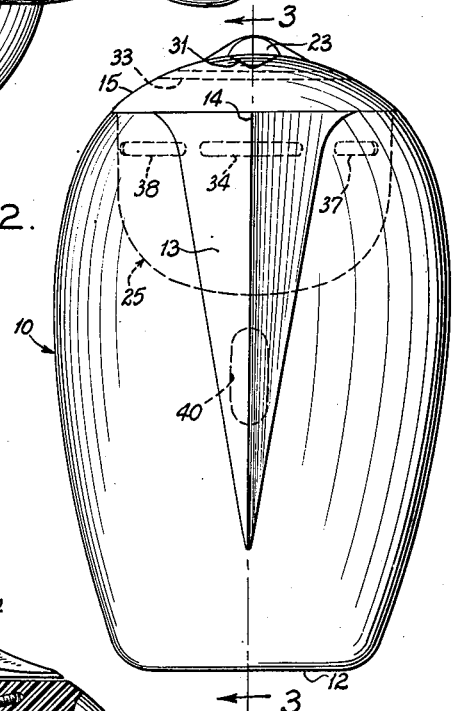
Fig. 2 is a side elevation of the dispenser as viewed toward the pouring or spout side thereof.

Proceeding now to describe the elements and function of the throttling valve structure controlling the delivery of hot water, and hence the extent of dilution of the poured beverage, this provision is for utmost simplicity, formed by and of the walls of the cup 25 together with the arcuate formation 20 of the pot. The latter is provided with a hot water passage 34 (Figs. 3 and 6), in the form of a horizontal elongate slot. So located as to be brought selectively to register with the port at the entrance of passage 34, is a port, or more than one, of a comparable width and formed in the upper region of the cylindrical portion 27 of the cup 25. In the present example, two such ports are provided, these including a shorter port or passage 37, and a somewhat longer passage 38 the locations and relation of which will best appear from Fig. 2 as shown in dotted lines. Each of the ports 37 and 38 is however of a lesser effective area than the area of the port at the entrance to passage 34.

Although the side wall portion 27 of the water cup 25 has been referred to as cylindrical, it is preferred that this wall be formed so as slightly to converge downwardly of its upper portion, and it is also preferable so to form the inside arcuate surface of the formation 20, so as to conform to such tapered shape. From this it results that, as the cup 25 is seated in place as in Fig. 3, it will by gravity tend to perfect a seal between the valve proper consisting of the ported walls 27, and the valve seat found in the conforming inner surface of portion 20.

Figure 3:
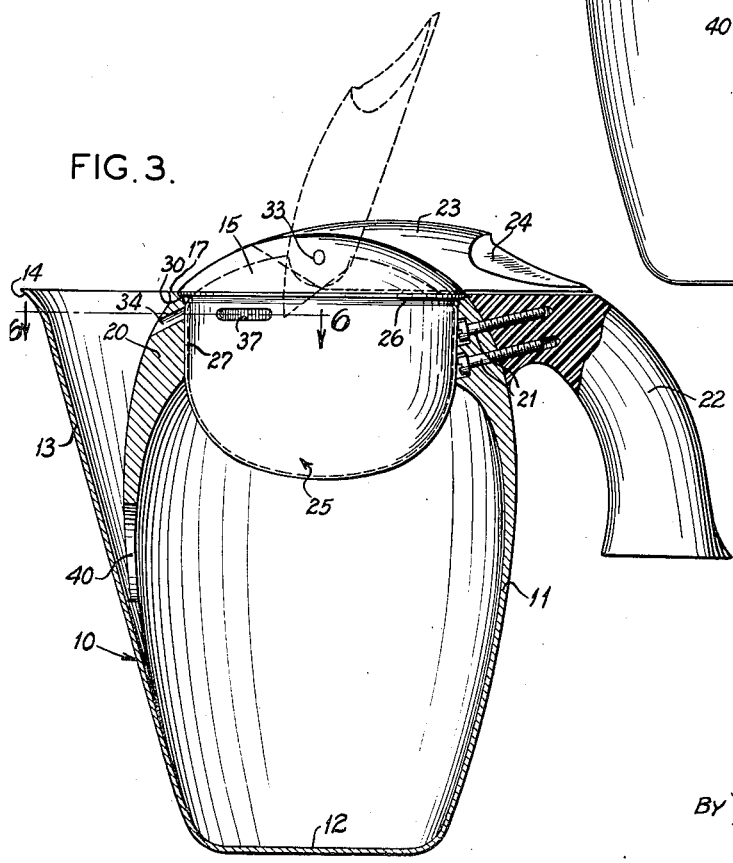
Fig. 3 is a vertical sectional view, a minor portion of which is in elevation, the sectional part of Fig. 3 being taken along line 3—3 of Fig. 2.

The manner of usage and the function of the several parts of the dispenser assembly are thought to have become fully apparent from the structural description, but it may be noted for completeness that, as a first step, assuming coffee to be the beverage served, a drip-type maker DCM including a basket B will be charged in the usual manner with the pre-extracted coffee of suitable grind, and water added as through the opening below cover C, and coffee brewed in conventional or other suitable manner. Although a drip-type maker has been mentioned, a percolator, vacuum type coffeemaker, or other suitable extracting arrangement may be employed, there being no intended restriction as to mode of original brew. Upon completion of the extracting process, the beverage of maximum strength is either made in or poured into the chamber of the pot 10 for later delivery through the coffee outlet opening 40, whence it is directed into the spout 13. The water reservoir cup 25 is now filled or partly filled with hot water through the opening below handle 23, such handle closed, and this assembly inserted into operative position as shown in Fig. 3. Assuming now that full strength coffee is desired by one or more users, the reservoir-valve-cover unit is positioned with the parts as shown in Fig. 1, so that the pointer marked "strong" lies directly opposite the lug or index mark 17. The section of Fig. 6 shows the position of the valve elements when the valve rotor-cover 15 is positioned as in Fig. 1. The port and passage 34 for water delivery are now closed off as will appear from Fig. 6, so that upon tilting the pot for pouring, there will issue from spout 13 the coffee of desired maximum strength, without water dilution. When, however, coffee of medium strength is desired, the cover handle 23 hence the valve rotor and dial are actuated in a clockwise direction (Fig. 1) about a vertical axis, so as to bring the pointer marked "medium" opposite the index lug 17. In such a valve setting, the short port 37 will be brought opposite the slotted port at the entrance to passage 34, so as to permit a restricted flow of hot water through the port 37 into passage 34, thence into the stream of full strength coffee issuing from port 40 and outwardly through spout 13. In case a relatively weak coffee be desired from the same brew, the handle 23 is actuated counterclockwise (Fig. 1) to center the "weak" pointer 16 opposite the lug 17, thus bringing the larger port 38 of the valve barrel and reservoir opposite the water discharge passage 34, and thus providing for a maximum delivery of hot water into the stream of original brew, with maximum desired diluent effect. It is here important to note that the extent of graduations on the valve rotor-cover 15 is not confined to the three positions shown. Depending upon the area and shape of valve port in the member 27, it will be understood that a single pouring port will suffice, and that the effective area of pouring passage may be infinitely varied from the maximum desired, down to a zero water delivery, merely by selecting the degree of registration of a fixed port and a movable port such as 34 and 38 respectively. It is accordingly noted that any number of intervening graduations may be provided on the valve rotor-cover 15 for added nicety of control of dilution effect, hence strength of beverage served.

In the case of tea, same may be brewed in the pot 10, for example by immersing a suitable number of tea bags or otherwise confining the tea leaves in hot water. In such case a somewhat more capacious water cup 25 may be provided, and the water ports be somewhat differently proportioned, all within the principles earlier described.

It will now have appeared that the dispensing assembly as described will serve fully to realize the several objectives hereinabove expressed, as well as others implied from the description of parts and their function. Although the invention has been described by detailed reference to the elements of a single embodiment, such detail of description should be understood solely in an instructive, rather than in any limiting sense, numerous variants being possible within the scope of the claims hereunto appended.

I claim as my invention:

1. In a dispenser for serving a beverage of at least two components, an outer container for one of said components provided with an external beverage-pouring passage, an inner container for another of said components, the inner container being movable about an axis within the outer container, and the inner and outer containers being provided with contiguous ported walls formed to constitute coacting rotary valve elements located in the line of flow of the component out of the inner container, said valve elements arranged to deliver such flow into the pouring passage concurrently with a flow thereto, of the first said component, whereby to vary the proportion of the components of the beverage incident to delivery thereof from the dispenser.

2. In a coffee dispensing pot, an outside pouring container provided with a spout in its upper portion supplied from the pot, a combined water cup and rotary valve member provided with a plurality of ports in its upper portion, a valve seat in the upper portion of the pot, and having a passage therethrough directed to the spout of the pot, the inlet end of said passage being located adjacent the cup to coact with same as a valve member so as selectively to register said inlet end with the several ports in the upper portion of the water cup.

3. In a coffee serving pot, a cover for the pot, the upper interior portion of the pot being formed as a valve sleeve, a water container depending from the cover into the pot, and rotatable within the valve sleeve as a valve barrel, the water container and the sleeve being provided with adjacent, coacting throttling ports, and the container being controllable by partial rotation of the cover to vary the relation of the ports and the delivery of water from the water container through the ports, as the cover is rotated.

4. In a coffee dispensing pot, an outer container for coffee provided with a pouring spout, said container having a top opening, and a cover for said opening on and with which is formed a water reservoir, a water delivery control valve, comprising a valve sleeve in the upper portion of the pot, a valve barrel consisting of the water reservoir, the sleeve and barrel being provided with selectively registrable throttling ports, establishing selective communication between the reservoir and spout, the cover being rotatable to control the valve.

5. In a coffee dispensing pot, an outer container for coffee, an inner container for water located in the upper portion of the outer container, the inner water container having an upper wall portion constituting a cover for the pot, and a closure in said cover, arranged for opening and closing manipulation to enable the addition of water to the water container without removal of the cover from the pot, and means controllable by actuation of the cover, to vary the proportion of water and coffee to be dispensed from the pot.

6. In a variable strength coffee dispenser, an outer container for coffee, an inner container for water, each of the containers being provided in an upper side wall portion thereof, with coacting throttling ports, selectively registrable such that the ported walls serve as adjacent valve elements manipulable by rotation of the inner container with respect to the outer, the inner and outer containers being provided with indicia significant of valve position.

7. In a variable strength coffee dispenser including a pouring pot provided with a top opening and a spout, a water reservoir normally seated within the top opening of the pot and provided with a downwardly tapered, ported wall section, the pot being provided internally of its upper portion with a valve seat surface conforming to the tapered wall portion of the water reservoir, and provided with a port opening into the spout, the port and delivery passage coacting with the ported area of the reservoir wall to provide a throttled control of flow of water from the reservoir into the coffee as delivered from the spout, and an actuating element on the water reservoir to facilitate throttling movement thereof.

8. The combination and arrangement of elements as recited by claim 7, but further characterized in that the water reservoir and valve seat surface coact to constitute a rotary valve structure formed of the upper side walls of the pot and reservoir and located just inwardly of the spout region of the pot.

9. In a coffee serving dispenser including an outer container or pot provided with a spout, an inner container for water, a rotary valve opening laterally thereof into the spout and constituted by adjacent apertured wall elements of the pot and the inner container and a dial control on the top of the pot, operatively connected to the valve elements for varying the delivery of water, said dial control including a dial rotor provided with indicia significant of strength of coffee to be poured from the dispenser, and indicia adjacent the dial rotor, coacting with that on the dial.

10. The combination and arrangement of elements and features as recited by claim 9 but further characterized in that the dial consists of a top cover for the coffee container and the water container, and in which the water container cover and a rotary valve element are combined in a single normally closed valve body forming the water container.

11. In a variable-strength coffee dispenser, a coffee pot provided in its upper region with a pouring spout, a handle opposite said spout, the pot being provided inwardly of its top portion, with a relatively heavy or thickened internally projecting annulus, integral with and forming a continuation of the walls of the pot proper, the pot wall below said annulus being provided with a coffee delivery opening into the spout, and said annulus being provided in its upper portion with a water delivery passage, a water reservoir in the form of a cup, the upper portion of which is of a generally cylindrical shape but formed with its side walls slightly downwardly converging, said walls being provided in their upper region with a series of water delivery ports of graduated areas so shaped and located as to be brought selectively into register with said water delivery passage, a cover for the pot constituting also a cover for the water reservoir, and overhanging the walls of the water reservoir, the inwardly extended annulus in the upper region of the pot being formed with a shoulder arranged to support in rotatable relation, the overhung margin of the cover, the water reservoir being attached to the cover, the cover being provided with a handle for rotation of the cover and therewith the water container, and the cover being provided with an opening beneath and normally closed by the last said handle, a pivot structure for the last said handle, enabling same to be lifted, for opening and closing the water opening into the reservoir, the cover being provided with indicia of a significance such as to locate, incident to partial rotation of the pot cover and reservoir, the strength of coffee to be poured from the pot, and the pot being provided with fixed indicia having at least the significance of a reference mark for that on the cover, and located adjacent the margin of the cover, said handle serving the water container opening, when in closed position, constituting a continuation of the pot handle, and being shaped for digital actuation by the hand of a user while gripping the pot handle.

HENRY C. HEIER.

REFERENCES CITED

The following references are of record in the file of this patent:

UNITED STATES PATENTS

| Number | Name | Date |
| --- | --- | --- |
| 994,949 | Papendray | June 13, 1911 |
| 1,569,445 | Workman | Jan. 12, 1926 |
| 2,032,763 | Mostkoff | Mar. 3, 1936 |